US012748773B2

(12) United States Patent
Gandhi et al.

(10) Patent No.: US 12,748,773 B2
(45) Date of Patent: Sep. 29, 2026

(54) MIGRATING FROM A PRIMARY DATASTORE TO A SECONDARY DATASTORE

(71) Applicant: Stripe, LLC, South San Francisco, CA (US)

(72) Inventors: KarthikBalaji Gandhi, Sammamish, WA (US); Bryce Plunkett, Seattle, WA (US); Alexander Rhee, Toronto (CA); Brian Kachmarck, Norwell, MA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 19/071,722

(22) Filed: Mar. 5, 2025

(65) Prior Publication Data

US 2026/0267873 A1 Sep. 10, 2026

(51) Int. Cl.

*G06F 16/27* (2019.01)
*G06F 16/21* (2019.01)
*G06F 16/23* (2019.01)

(52) U.S. Cl.

CPC ............ *G06F 16/27* (2019.01); *G06F 16/214* (2019.01); *G06F 16/2379* (2019.01)

(58) Field of Classification Search

CPC ...... G06F 16/27; G06F 16/275; G06F 16/278; G06F 16/214; G06F 16/2379
USPC .......................................................... 707/639
See application file for complete search history.

(56) References Cited

U.S. PATENT DOCUMENTS 8,131,672 B2 * 3/2012 Hind ..................... G06F 16/275 707/610
11,106,695 B2 * 8/2021 Yang ................... G06F 16/2358
2012/0323849 A1 * 12/2012 Garin, Jr. ................ G06F 16/27 707/E17.005

* cited by examiner

*Primary Examiner* — Michael Pham
(74) *Attorney, Agent, or Firm* — BAKERHOSTETLER

(57) ABSTRACT

Aspects of the subject technology provide for synchronization between a first database and a second database. When a repeated command to a second database for a write operation to the second database is not performed, a forward synchronization process can update records from the first database to the second database. A reverse synchronization process can be used to further check that the synchronization is complete.

20 Claims, 5 Drawing Sheets

MIGRATING FROM A PRIMARY DATASTORE TO A SECONDARY DATASTORE

TECHNICAL FIELD

The present description generally relates to migration from one datastore to another datastore, for example, where the primary datastore is implemented by a first datastore technology and the second datastore is implemented by a different datastore technology or where the primary datastore corresponds to a first version of a datastore technology and the second datastore corresponds to a different version of the datastore technology.

BACKGROUND

Developers may need to switch data from one database to another database for a variety of reasons. This can be performed easily offline because the primary database can be static while information is copied to the other database. In many circumstances, however, the primary database may need to be kept active until ongoing operations are switched to the other database. This presents a challenge because after copying the data from the primary database to the other database, the data may become stale at the other database while trying to switch from the primary database to the other database.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

Figure 1:
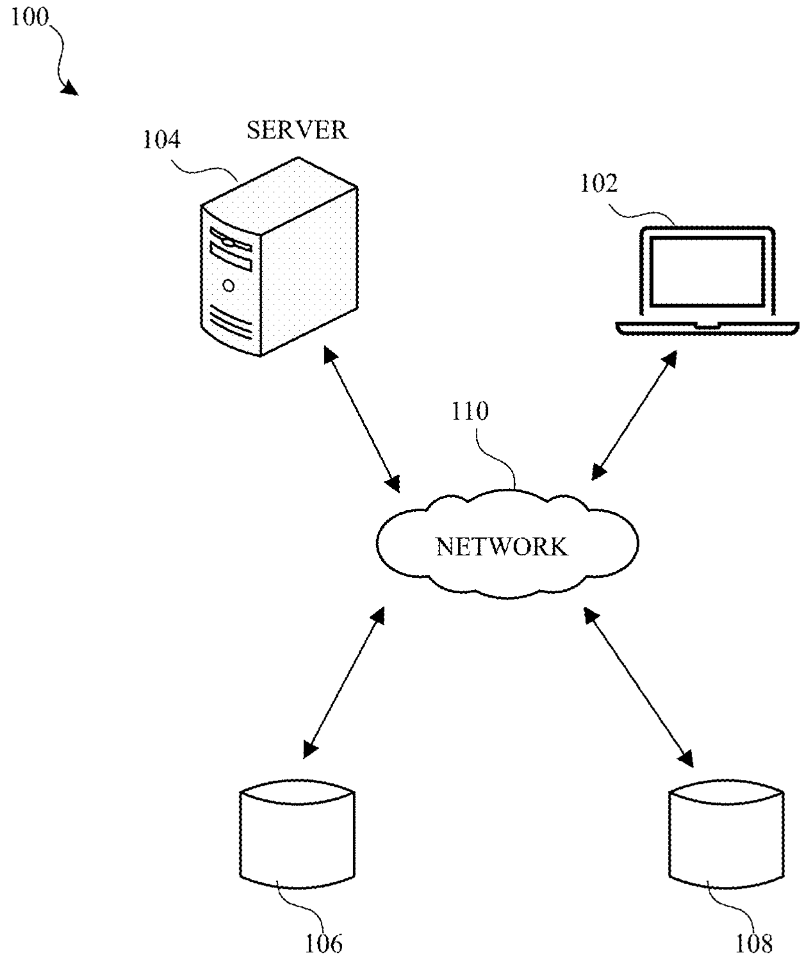
FIG. 1 illustrates an example system environment in which the subject technology may be implemented, in accordance with one or more embodiments.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other embodiments. In one or more embodiments, structures and components are shown in block diagram form in order to avoid obscuring the concepts of the subject technology.

Enterprise systems utilizing database technologies may from time-to-time need to update a database or transition from one database technology to another database technology. This may be challenging in systems that require nearly 100% uptime. For example, it is desirable that such systems would not need to be taken offline to synchronize the data in one database with the data in the updated or different database.

The subject technology provides a solution for database switchover, e.g., from one database technology to another database technology or from one database version to another database version, which ensures reliability and synchronization between the two databases without impact to end user experience. In order to effectively switch from one database to another database, the subject technology may implement processes which ensure data replication from one database to the other database, both in a backfill process and in an ongoing process. For example, data currently in the active or primary database is backfilled or copied into the secondary or backup database. Ongoing database queries or sets of queries are executed on both databases using dual ops. In this manner, the database switching accounts for any potential database changes prior to and during the switchover.

Aspects of the subject technology are implemented in a manner that ensures that the backup and switchover processes do not negatively impact the performance of whichever database that is currently designated as the primary database. For example, as explained in further detail below, queries or sets of queries executed on the secondary database can be dropped if queuing the queries would cause a delay in the processing of queries implemented on the primary database. Thus, the backup and switching strategies may be implemented so that they do not impact performance of the primary database. Aspects of the subject technology also provide for cross-checking that the data in the primary database matches the data in the secondary database prior to switchover, utilizing live dual ops or operations (e.g., dual writes and dual reads), offline or delayed cross-checking using forward and reverse synchronization (as explained in greater detail below), and consistency checks using separate processes involving online datasets and database snapshots.

Aspects of the subject technology may also implement database switching in a manner that is opaque to end-users. In other words, the end-users need not know or care that one database technology or version is switched to another database or technology.

Aspects of the subject technology may also provide that during the switchover, the switchover time occurs within a tolerable retry time for a database change. In other words, when the system includes a retry time, after a first database write fails due to disabling write access during the switchover, the system may pause a few seconds and initiate a retry in a manner that is within normal operations. In aspects of the subject technology, the switchover may occur during the retry time.

FIG. 1 illustrates an example system and network environment 100 in which the subject technology may be implemented, in accordance with one or more embodiments. Not all of the depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, a server 104, and a primary database server 106, and a secondary database server 108. The network 110 may communicatively (directly or indirectly) couple one or more of the electronic devices 102, the server 104, the primary database server 106, and the secondary database server 108. In one or more embodiments, the network 110 may be an interconnected network of devices that may include, or may be communicatively coupled to, the internet.

For explanatory purposes, the network environment 100 is illustrated in FIG. 1 as including the electronic device 102, the server 104, the primary database server 106, and the secondary database server 108; however, the network environment 100 may include any number of electronic devices and/or any number of servers communicatively coupled to each other directly or via the network 110. In addition, the various systems of FIG. 1 may be, and/or may include all or part of, the electronic system discussed below with respect to FIG. 5.

The electronic device 102 may be under the control of a user with authorization to access records associated with the server 104. For example, the user may be an administrative user associated with the server 104. The administrative user may, for example, have the authority to set up and initiate database transfers via the electronic device 102, in accordance with the subject technology. The electronic device 102 may be, for example, a wearable device (such as a watch, a band, and the like), a desktop computer, a portable computing device (e.g., a laptop computer), a point of service terminal, a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a laptop computer. The electronic device 102 may be associated with one or more accounts, credentials, or any other identity information registered with the server 104, the primary database server 106, and/or the secondary database server 108, in accordance with some implementations.

The server 104 may be and/or may include, for example, one or more servers that host or facilitate a process to manage data between the primary database server 106 and the secondary database server 108. For example, server 104 may run processes to ensure that data is synchronized between the primary database server 106 and the secondary database server 108, such as described herein. The server 104 may also include logic and programming for performing a database switchover, in accordance with the subject technology. The server 104 may also include logic and programming to enable the dual operations for writing database operations to two databases, such as described herein. The server 104 can provide messaging back to the electronic device 102 which indicate that a requested action was successful or not or provide feedback for anomalous behavior, such as described below. As an example, the server 104 may include logic to log events associated with the database switchover process and notify stakeholders when an inconsistency is observed which may indicate an error. In some embodiments, the server 104 may be implemented as a service of one or more servers. Such one or more servers or the server 104 may be, and/or may include all or part of, the electronic system discussed below with respect to FIG. 5.

The primary database servers 106 may be and/or may include, for example, one or more servers that host or facilitate a database or datastore service that may be used by one or more entities, and may store and organize data related to the electronic device 102 and/or server 104 and/or data resulting from data operations initiated by other devices. The primary database server 106 may be implemented as a database server application provided by one or more servers, such as the server 104, or one or more other servers, for example, configured in a distributed manner. Such one or more other servers or the primary database server 106 may each include all or part of the electronic system discussed below with respect to FIG. 5. The designation of primary database server should be understood as indicating that the primary database server 106 is the source of truth. As the source of truth, any discrepancies between the primary database server 106 and any other database server are resolved in the favor of the data in the primary database server 106. When a switchover is completed, however, from the primary database server 106 to the secondary database server 108, the designation of the source of truth also switches to the secondary database server 108 (and subsequently becomes the primary and the primary becomes the secondary). The primary database server 106 may utilize any suitable underlying datastore technology for implementing the record storing capabilities thereof. For example, the primary database server may be implemented as a relational database, object-oriented database, document database, hierarchical database, or graph database, or the like.

The secondary database server 108 may be and/or may include, for example, one or more servers that host or facilitate a database or datastore service that may be used by one or more entities, and may store and organize data related to the electronic device 102 and/or server 104 and/or data resulting from data operations initiated by other devices. The secondary database server 108 may be implemented as a database server application provided by one or more servers, such as the server 104, or one or more other servers, for example, configured in a distributed manner. Such one or more other servers or the secondary database server 108 may each include all or part of the electronic system discussed below with respect to FIG. 5.

In some implementations, the underlying technology for implementing the secondary database server 108 may be different than that of the primary database server 106. For example, the secondary database server 108 may correspond to a relational database, object-oriented database, document database, hierarchical database, or graph database, and the primary database server 106 may correspond to a different one of a relational database, object-oriented database, document database, hierarchical database, or graph database. In such implementations, for example, an administrator may want to change database technologies to achieve better efficiency or to move away from legacy systems, or other reasons. In other implementations, the underlying technology for implementing the secondary database server 108 may be similar to the primary database server 106 and may, for example, be a different version of the database server program that implements the databases. For example, a currently implemented version of the database at the primary database server 106 may be one revision of a program provided by a first database program provider and the version of the database at the secondary database server 108 may be a different revision of the same program provided by the first database program provider. In another example, a currently implemented version of the database at the primary database server 106 may be supplied by a first database program provider and the version of the database at the secondary database server 108 may be supplied by a second database program provider, even though each database has a same essential underlying technology, for example, each being a document database, or each being a relational database, and so forth. For example, an administrator may want to upgrade a database server version or switch from one database vendor to another database vendor. In some instances, one database, such as the primary database, may be implemented in a cloud architecture by a first service provider, and the other database, such as the secondary database, may be implemented in a cloud architecture by a second service provider.

In some implementations, the secondary database server 108 may be controlled by the overlapping processors as the primary database server 106. For example, the secondary database server 108 may be controlled by the same database controller as the primary database server 106.

Figure 2:
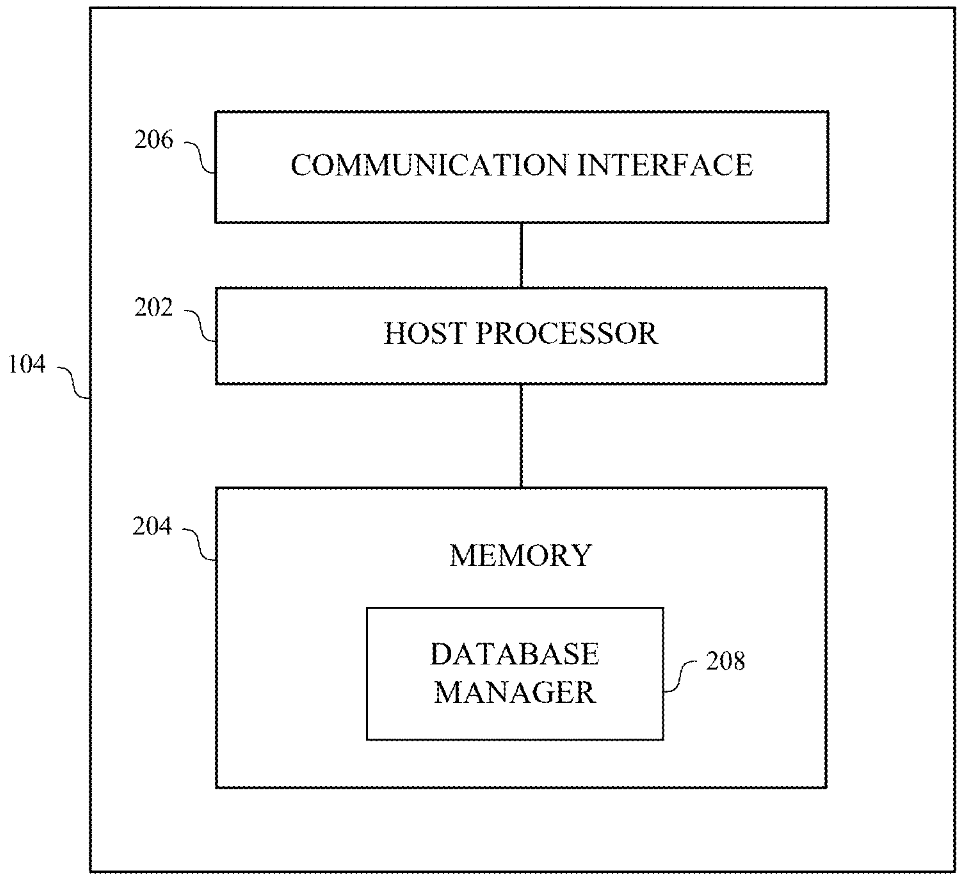
FIG. 2 depicts an example electronic device that may implement the subject technology, in accordance with one or more embodiments.

FIG. 2 depicts an example server 104 that may implement aspects of the subject technology, in accordance with one or more embodiments. For explanatory purposes, FIG. 2 is primarily described herein with reference to the server 104 of FIG. 1. However, this is merely illustrative, and features of the server of FIG. 2 may be implemented in any other electronic device for implementing the subject technology and/or any other server for implementing the subject technology, such as the primary database server 106 and/or the secondary database server 108. Not all of the depicted components may be used in all embodiments, however, and one or more embodiments may include additional or different components than those shown in FIG. 2. Variations in the arrangement and type of the components may be made without departing from the spirit or scope of the claims as set forth herein. Additional components, different components, or fewer components may be provided.

The server 104 may include one or more of a host processor 202, a memory 204, and/or a communication interface 206. The host processor 202 may include suitable logic, circuitry, and/or code that enable processing data and/or controlling operations of the server 104. In this regard, the host processor 202 may be enabled to provide control signals to various other components of the server 104. The host processor 202 may also control transfers of data between various portions of the server 104. The host processor 202 may further implement an operating system or may otherwise execute code to manage operations of the server 104.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). The memory 204 may include database manager 208 including executable programs, routines, and services that provide the functions described herein. The specific implemented database manager 208 may vary based on whether the memory 204 is implemented wholly or partially in the server 104 and/or other components of the system such as the primary database server 106 or the secondary database server 108. The memory 204, for example, can include logic and/or programming instructions for implementing part or all of the subject technology corresponding to the database manager 208.

The communication interface 206 may include suitable logic, circuitry, and/or code that enables wired or wireless communication, such as between the electronic device 102, the server 104, the primary database server 106, and/or the secondary database server 108. The communication interface 206 may include, for example, one or more of a Bluetooth communication interface, an NFC interface, a Zigbee communication interface, a WLAN communication interface, a USB communication interface, a cellular interface, or generally any communication interface.

In one or more embodiments, one or more of the host processor 202, the memory 204, the communication interface 206, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
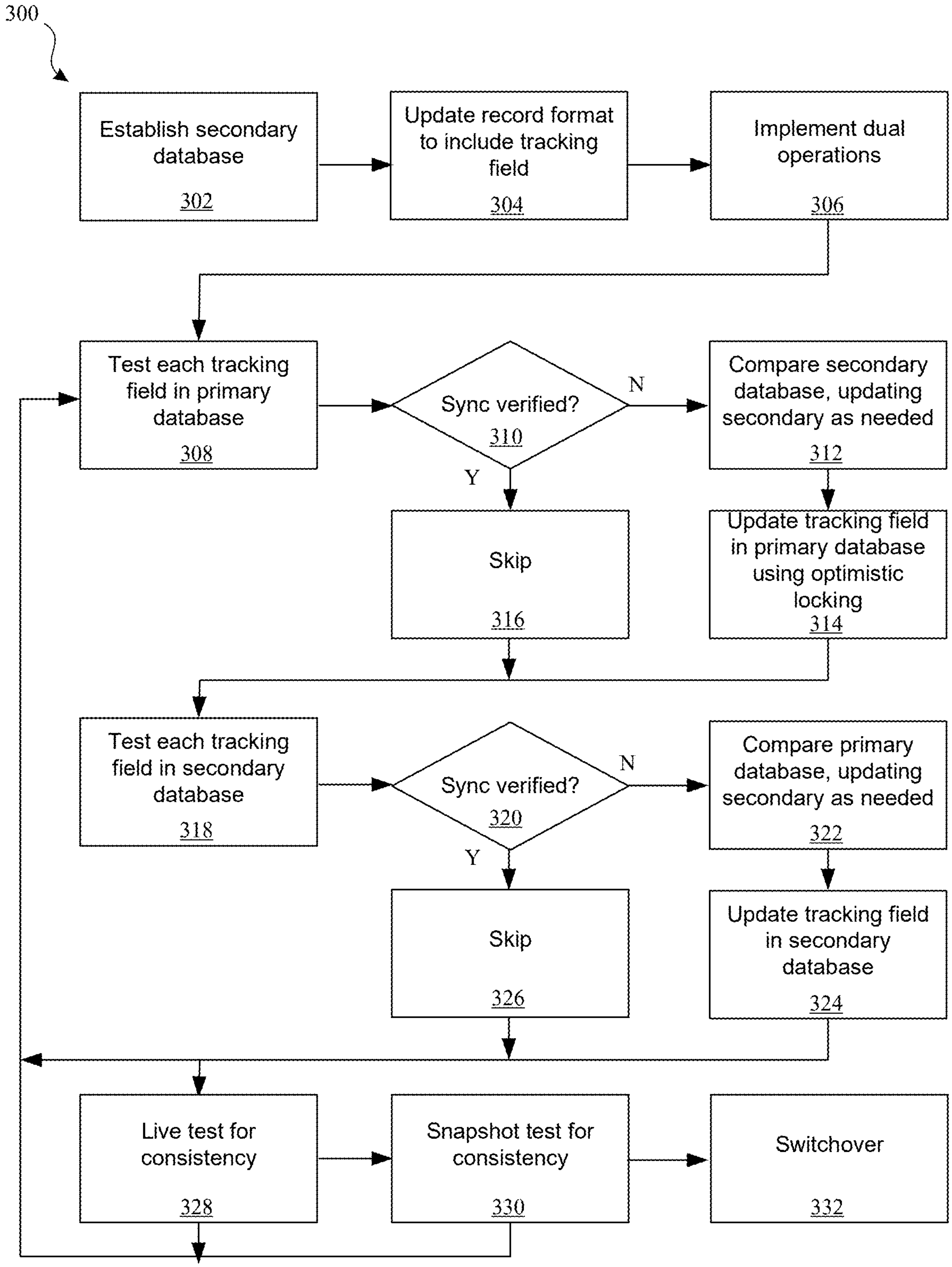
FIG. 3 illustrates a flow diagram for a database manager, in accordance with one or more embodiments.

FIG. 3 illustrates a flow diagram 300 which describes an implementation of a database switchover, in accordance with some implementations. Optional implementation aspects are provided for in the description below, but which may be omitted in the flow diagram for the sake of simplicity. The flow diagram 300 takes place primarily within the server 104 but may send and/or receive data with the electronic device 102, the primary database server 106, and/or the secondary database server 108. Although the discussion of the flow diagram 300 proceeds below describing the data flow from block to block, it should be understood that flow can be performed in parallel as appropriate or may flow out of the order described where the associated processes allow for the flow to differ. Although specific examples may be used to help elucidate the disclosure, it should be understood that the automated process management described below can be applied to any situation where a user would want to provide a database switchover or maintain a shadow backup of a database.

At block 302, a secondary database, such as the secondary database server 108, is established. As noted above, the secondary database may be a different type of database than an already established primary database or may be a different version of a similar type of database as the primary database, such as described above. In some implementations, a tracking field for tracking database monitoring can be added to the secondary database. As explained in greater detail below, the tracking field can be used to ensure that the record matches the corresponding record of the primary database server. The secondary database can be established in such a way that the fields of the primary database can be mapped into the fields of the secondary database using appropriate database commands. The mappings may be used so that when one database record is copied from the primary database to the secondary database, the fields will be copied in a manner such that all the data or all the selected data from the primary database is copied to the secondary database for each record. In implementations where the underlying database technology is different in the primary database and the secondary database, the mappings can define how the fields from the primary database are copied to the secondary database including any transformation of data to be done. In some implementations, following the creation of the secondary database and modification of the primary database, as noted with respect to block 304, the mapping can be used at block 308, before, after, or at the same time as block 306 is performed, to copy records from the primary database to the secondary database.

At block 304, the primary database, such as the primary database server 106, can be modified to include a tracking field for tracking database mirroring between the primary database and the secondary database. A similar tracking field can be added to the secondary database, if not already added during the creation of the secondary database. The tracking field, for example, can indicate whether the system considers the corresponding record to be synchronized or copied to the secondary database in a reliable manner. Thus, the tracking field can indicate if synchronization is verified or unverified. In the event that no copying has occurred, then the synchronization is considered unverified. However, even if copying has occurred, some processes can occur, such as record updates, which could cause the synchronization to become unverified. Including the tracking field in each database provides the ability to double check the synchronization between records as well as provides the ability to maintain correspondence between the databases such that the same process described herein can be used to switch back, if desired. In one or more implementations, the tracking field can initially be set to indicate that synchronization is unverified for all records in the primary database. This setting is used to perform the initial synchronization to copy each record from the primary database to the secondary database, such as described below at block 308. If any records are in the secondary database, in one or more implementations, the tracking field of the secondary database can also initially be set to indicate that synchronization is unverified for all records in the secondary database. This setting in the secondary database can be used for an extra verification for each of the copied records as described with respect to block 318.

At block 306, dual operations can be implemented for the primary database and the secondary database. For example, an operational command that updates the primary database, such as updating an existing record, adding a record, or deleting a record, can be modified to include a corresponding command for the secondary database. In such a way, modifications to the primary database are also performed on the secondary database. In some implementations, however, to prevent or reduce system unavailability, for example, during times of high database operations (e.g., large numbers of queries or blocks of queries), the writes to the secondary database may be implemented using a "best effort" strategy. That is, it may be that if the server is too busy to handle and/or execute the update to the secondary database, the operation can simply be dropped. In such situations, the databases will not be in synchronization. In some implementations, each time the primary database or secondary database is written to, the tracking field for the corresponding record can be updated to be indicated as being unverified (or out of synchronization). In some implementations, upon a write command to the primary database and/or secondary database, each corresponding record can have a version identifier for that record incremented and a nonce field updated. The version field and/or nonce field can be used to implement optimistic locking, described below, with respect to block 314. In some implementations, following a write command to the secondary database, a separate process can check the corresponding record in the primary database to determine if the record was written to the secondary database correctly. In such instances, the corresponding records can each have their corresponding tracking fields updated to indicate that their synchronization is verified. If a discrepancy is determined between the primary database and the secondary database for the record, however, the subject technology may indicate to users, for example, through a notification or other message, that there may be a potential issue with the queries to the secondary database. For example, the process of executing queries on both the primary and secondary databases may not be configured properly.

At block 308, as noted above, even though dual operations have been instituted at block 306, each of the records of the primary database and secondary database may not be in synchronization because, first, the operation to the secondary database may not have been implemented, and second, the prior existing records already in the primary database may have not yet been copied to the secondary database. Thus, at block 308, a forward synchronizing process can be initiated. The forwarding synchronization process examines records in the primary database and copies them to the secondary database (if not already in the secondary database) or updates the corresponding records in the secondary database (if it does not match the corresponding record in the primary database). In some implementations, if the record does not exist in the secondary database, the record can be copied to the secondary database using the mapping previously established. In some implementations, each record in the primary database with a tracking field indicating that synchronization is unverified can be tested to determine if the corresponding record matches in the secondary database. Other implementations can test both verified and unverified records. At block 310 for example, if the tracking field of a record in the primary database indicates that the record is unverified, then a corresponding record in the secondary database can be compared to the first record and updated as needed. For example, if the record does not exist in the secondary database, the record can be copied from the primary database to the secondary database. If the record exists, but has different values, the record in the secondary database can be updated to match the primary database. If the record exists and has matching values, then the corresponding record of the secondary database can be considered up to date. If the record in the secondary database is updated, the tracking field for the record in the secondary database can be set to indicate that the field is unverified. This setting will provide the opportunity to perform a reverse synchronization to determine that the record has been copied and/or updated. It may be desirable to perform the reverse synchronization especially in instances where the underlying database technologies are different, to ensure that the data is being updated and or copied in the expected manner. In some implementations, the copied or updated field can be set to verified instead, such that the reverse synchronization can be skipped or bypassed, unless, for example, another writing process alters the record in the secondary database for some reason and sets the tracking field back to unverified. In some implementations the reverse synchronization, such as described below starting at block 318, for that record may be performed immediately after performing the forward synchronization.

At block 314, after synchronizing the corresponding record of the secondary database, the tracking field for that record in the primary database can be updated to indicate that the forward synchronization has been completed and that the record is verified to have been written and/or updated into the secondary database. For example, a write command can be provided to the primary database to update the tracking field for that record. In some implementations, the write command can be provided using optimistic locking. For example, a nonce field can be provided in each record of the primary database that includes a nonce that changes each time the record is updated. When the update of the tracking field is requested, the nonce can be provided and if the nonce fails to match, then the updating can be bypassed, as this may indicate that the record has changed from the time it was synchronized to the secondary database to the time that it was attempted to be updated to indicate that the tracking field is verified. Since updating the tracking field is bypassed in such instances, the tracking field will continue to indicate that the synchronization is unverified so that it can subsequently be checked again when the process beginning at block 308 is executed again for that record. It is noted that each time a record is updated, the tracking field can be set to unverified so that forward synchronization can occur if and when the block 308 is executed again.

Returning to block 310, if the tracking field indicates that the synchronization status of the record is unverified, then the synchronizing for that record can be bypassed, such as indicated at block 316. This may be implemented in a variety of ways based on the database technology. For example, in some implementations, a query can return all unverified records and the verified records are simply not considered. The first time block 308 executes, the prior records in the primary database are effectively backfilled to the secondary database. In some implementations, the process at block 308 can be executed subsequently to an initial execution (as described below) and in such cases, a subset of the records of the primary database (those that have since been marked as unverified) can be processed at block 312 and block 314.

In addition to the forward synchronization beginning at block 308, a reverse synchronization can be implemented beginning at block 318. Each tracking field indicated as unverified in the secondary database is tested to determine if the corresponding record in the primary database is different. At block 320, the tracking field for a record of the secondary database is tested to determine if the record is unverified. If so, then at block 322, the record is compared to the corresponding record of the primary database. If the record is different than that of the primary database, then the record in the secondary database is updated to match that in the primary database. At block 324, once synchronized, the tracking field for the corresponding record in the secondary database can be updated to indicate that the reverse synchronization of the record is verified according to the reverse synchronization process.

Returning to block 320, if the tracking field indicates that the record is verified, then the synchronizing for that record can be bypassed, such as is indicated at block 326. This may be implemented in a variety of ways based on the database technology. For example, in some implementations, a query can return all unverified records and the verified records are simply not considered. The first time block 318 executes, all of the backfilled records copied from the primary database to the secondary database are each double-checked. In some implementations, the process at block 318 can be executed subsequently to an initial execution (as described below) and in such cases, a subset of the records of the secondary database (those that have since been marked as unverified) can be processed at block 322 and block 324.

Another process that can be implemented by the flow diagram 300 includes a live test for consistency at block 328. Given the forward synchronization and the reverse synchronization processes provided above, each record of the primary database and the respective corresponding record of the secondary database should both have tracking fields indicating that their synchronization is verified. The live test for consistency at block 308 can execute a test against the primary database and the secondary database that determines for a specific period of time, for each record in the primary database marked as verified, and for a corresponding record in the secondary database marked as verified, whether any inconsistencies occur. For example, updates to the primary database over the last 1 hour, 4 hours, 8 hours, 24 hours, and so forth, may be tested. For each record where the tracking field indicates the record is verified, a corresponding record can be compared from the secondary database where the corresponding record's tracking field indicates the record in the secondary database is also verified. If the comparison indicates that the records contain different data, then the system can determine that there is an error in one of the steps. For example, a discrepancy between the records in the consistency check at block 328 can indicate that a user has misconfigured their sync jobs or verification fields (for example used in the forward and/or reverse synchronization processes). This can serve as a check which indicates that an error in the synchronization of the data is occurring.

Another check can be performed at block 330 which performs a further consistency check. In some implementations, for example, a snapshot of both the primary database and secondary database can be taken at various intervals. For example, the snapshot may correspond to a separate backup or archival process. Thus, the snapshots may be stale, but the data from each snapshot can be compared for consistency. For example, the data from the snapshots can be piped to tables which can be queried to join the tables from the snapshots and filtered to only analyze rows that contain discrepancies between the snapshots. Any discrepancies can be investigated. This further check is especially effective for verifying consistency since it is started from a separate code path, being based on snapshots.

The flow from each of the blocks 314, 316, 324, 326, 328, and 330 may return to the forward synchronizing block 308. For example, the processes represented by blocks 308, 318, 328, and 330 can be repeated until such time as the switchover from the primary database to the secondary database occurs. The switchover may also be optional. For example, in some implementations, the goal may be to have a live up-to-date backup of the primary database that can be switched over as a fail-safe as necessary, but that which may not be switched unless the primary database fails for some reason. It is also contemplated that the processes represented by block 308 may be executed for all records in the primary database and then the processes represented by block 318 may be executed for all records in the secondary database. In other implementations, however, the processes represented by block 308 may occur for a first record of the primary database and then the processes represented by block 318 may occur for the corresponding record of the second database. Flow may then continue back to the block 308 and then to the block 318, and so forth, until all the records have been processed.

At block 332, if a switchover is performed, the switchover can be initiated. If any anomalies resulting from the process of 328 and/or 330 exist, those can be handled prior to a switchover so that no known errors are occurring. For example, as noted above, since the forward synchronization of block 308 and the reverse synchronization of block 318 have each occurred, the primary and secondary databases should be synchronized on a record-by-record basis. If an anomaly exists, the developers may debug the system to determine why the anomalies exist. In some instances, anomalies within a given time period may be ignored. For example, it may be expected that any changes in the last hour may not yet be fully synchronized, depending on the schedule at which the processes at block 308 and/or block 318 are performed.

Once the anomalies have been handled or have been determined to fall within the time since last synchronization (i.e., ignored), the switchover can be initiated, for example, by quiescing (pausing) writes on the primary database, performing forward synchronizing (block 308), performing reverse synchronizing (block 318), switching the source of truth to the secondary database server (and logically swapping primary for secondary in the above-described roles of the database servers, e.g., at blocks 306, 308, 318, 328, and 330), then enabling writes on the primary database server (what was the secondary database server). After switching the processes at blocks 306, 308, 318, 328, and 330 can continue. Thus, if necessary, the switching at block 332 can be initiated again to switch back to the prior primary database and prior secondary database.

The switchover can be completed nearly instantaneously. For example, the switchover can be initiated immediately following the forward synchronization of block 308 and/or the reverse synchronization of block 318, and after one or more of the fault checks of block 328 and 330 have been performed. The status of the primary database and the secondary database should be such that only a small number of operations may have occurred to the primary database and the secondary database. Thus, after quiescing the primary database write operations, performing the forward synchronization at block 308 and the reverse synchronization at block 318 may be done quickly, including nearly instantaneously.

For example, it may be that when a database write fails, the system provides for a retry operation after a set period of time. The switchover of block 332 can be accomplished within that retry period in accordance with some implementations. For example, if the retry period is 5 seconds, then the switchover can take place within 5 seconds. An end user waiting for confirmation, for example, from server 104 that a write was accomplished which initially failed due to the quiescence of the primary database, can be provided confirmation of a successful write after the retry period. Other retry periods are contemplated, such as 1 second, 2 seconds, 10 seconds, 30 seconds, and so forth. In addition, multiple retry periods are contemplated. For example, a first retry period may be 2 seconds and a second retry period 5 seconds if the write fails after the first retry period. In such implementations, the switchover can occur prior to the end of the last retry period. If the switchover cannot be completed for some reason prior to the end of the last retry period, the switchover can be aborted and writes to the primary database can be resumed without switching over the databases and without switching the source of truth.

In some implementations, in addition to the forward synchronization at block 308 and the reverse synchronization at block 318, prior to finishing the switchover, the live test at block 328 can be performed for a reduced period of time, for example, the previous ten minutes, as an additional check. Notably, while the primary database is quiesced, the primary database can still respond to read requests.

It should be understood that although a single secondary database is described, implementations may contemplate a tertiary database using the processes and logic outlined above.

Figure 4:
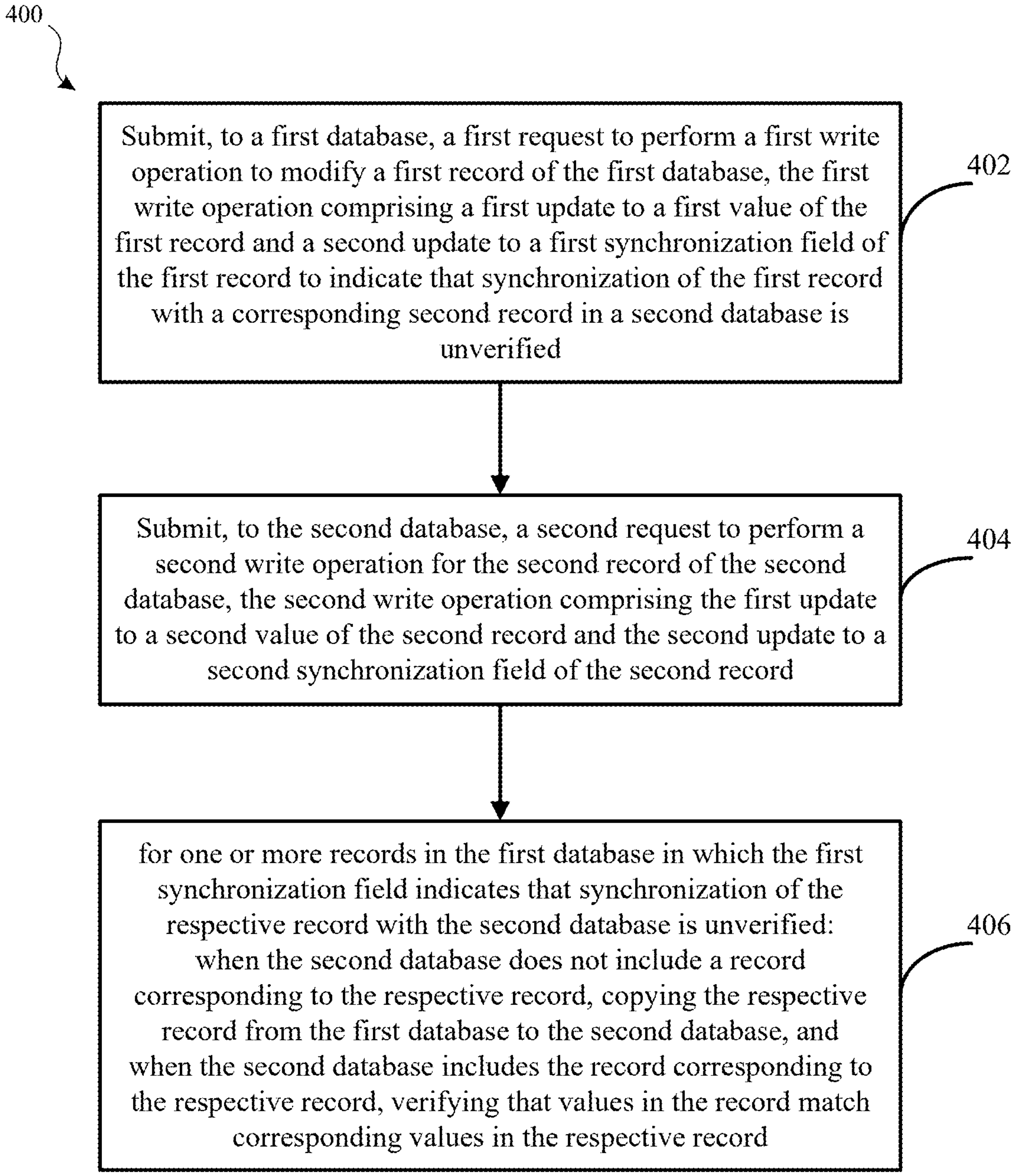
FIG. 4 illustrates a flow diagram of an example process for migrating from a primary datastore to a secondary datastore, in accordance with one or more embodiments.

FIG. 4 illustrates a flow diagram of an example process 400 for providing from a server, such as the server 104, a mechanism for processing automated responses to events and determining if a recursion is detected, in accordance with the subject technology. For explanatory purposes, the process 400 is primarily described herein with reference to the workflow server 104. However, the process 400 is not limited to these, and one or more blocks of the process 400 may be performed by one or more other by other suitable devices. Further, for explanatory purposes, the blocks of the process 400 are described herein as occurring sequentially or linearly. However, multiple blocks of the process 400 may occur in parallel. In addition, the blocks of the process 400 need not be performed in the order shown and/or one or more blocks of the process 400 need not be performed and/or can be replaced by other operations.

As shown in FIG. 4, at block 402, process 400 may include submitting, to a first database, a first request to perform a first write operation to modify a first record of the first database, the first write operation comprising a first update to a first value of the first record and a second update to a first synchronization field of the first record to indicate that synchronization of the first record with a corresponding second record in a second database is unverified.

For example, a user can perform an action that causes a first database write operation to update a record at the first database. The write operation to modify the first record can include updating a current record or inserting a new record. The first write operation, for example, can include a first update of a first value in the first record and a second update to a first synchronization field in the first record. The first value may correspond to a value of a field or other entry in the first database for the first record. The first synchronization field can correspond to the tracking field discussed above. In either an operation for inserting a new record or updating an existing record, the record can be updated to include an indicator, such as the tracking field discussed above, that the record has been modified and/or that synchronization with the second database is unverified.

As also shown in FIG. 4, at block 404, process 400 may include submitting, to the second database, a second request to perform a second write operation for the second record of the second database, the second write operation comprising the first update to a second value of the second record and the second update to a second synchronization field of the second record. For example, the write operation that was provided to the first database may also be submitted to the second database. The write operation, for example, may be to update or insert a new record corresponding to the record updated or inserted at the first database.

For example, one or more implementations may submit a write operation to the second database to update the second database in a manner consistent with the first write operation. The write second write operation, however, can be submitted according to a best effort policy that allows the instruction to be dropped if it cannot be executed in a timely manner. In some instances, however, it is contemplated that the second database write operation, however, may not be performed for whatever reason. For example, such as described above with respect to block 306, system resources may be unavailable to complete the write request within an acceptable time. Rather than queue the operation, the second write operation can simply be dropped.

As further shown in FIG. 4, at block 406, process 400 may include, subsequent to the second request and when the second database does not include the second record, copying the first record to the second database as the second record and submitting a request to update the first synchronization field of the first record to indicate that synchronization of the first record is verified. For example, if the write operation to the second database in block 404 did not succeed and was dropped, then the process 400 at block 406 can perform a subsequent copying operation to copy the record from the first database to the second database. Then, a write request can be made to the first database to update the first synchronization field to indicate that synchronization of the record is verified. This request may be made with optimistic locking, as described above. When the request to update the first synchronization field fails due to the optimistic locking disallowing an update when the request is made, the process can subsequently perform a process to verifying that values in the second record match corresponding values in the first record and another request can be submitted to update the first synchronization field of the first record to indicate that synchronization is verified. Again, this other request may be submitted with optimistic locking. Thus, the request to update the first synchronization field may fail, and the verifying the record and submitting the update request can be repeated periodically until the update succeeds. Verifying the records may also include updating the second record of the second database as needed to match corresponding values in the first record.

In some implementations, subsequent to the second request and when the second database includes the second record, the process 400 may verify that values in the second record match corresponding values in the first record, and a request can be submitted to update the first synchronization field of the first record to indicate that synchronization of the first record is verified. As described above, this request may be made with optimistic locking and may fail. In such instances, verifying the record and submitting the update request can be repeated periodically until the update succeeds. Verifying the records may also include updating the second record of the second database as needed to match corresponding values in the first record.

In some implementations, when the second synchronization field indicates that synchronization of the second record is unverified, values in the second record may be verified as matching corresponding values in the first record and updating the second synchronization field of the second record to indicate that synchronization of the second record is verified. Verifying the records may also include updating the second record of the second database as needed to match corresponding values in the first record.

In some implementations, the process 400 can also include that, for each record in the first database which has a respective first synchronization field indicating that synchronization of the respective record is unverified, copying the respective record to the second database when a corresponding record does not exist in the second database, or verifying that values of the corresponding record match values of the respective record when the corresponding record does exist in the second database. For example, records of the first database which were written to the first database prior to implementing dual operations to the second database can be copied to the second database. Also, in the event that an existing record in the first database was updated and the first synchronization field set to unverified, verification that the values of the first record match the values of the second record can be performed. Such verification can include updating the values of the corresponding record in the second database as needed to match the corresponding record in the first database. Then, a request can be submitted to update the respective first synchronization field to indicate that synchronization of the respective record is verified. This process may correspond, for example, to the forward synchronization process described above with respect to blocks 308-316. This process, for example, may correspond to a first synchronization process that may occur offline or asynchronously with the first database write or when database usage is low. The forward synchronization can synchronize all records from the first database to the second database which are marked as having an unverified synchronization status. If this is the first time this aspect has been implemented, then the first synchronization provides a backfill operation to copy all previous records from the first database to the second database. In some implementations, the tracking fields indicating that the synchronization status is unverified for the record may each be updated upon synchronization (whether the corresponding record of the second database was updated or not) to indicate that the synchronization of the records are verified. Thus, the first synchronization may update a record of the second database to match a corresponding record of the first database, where the record of the second database corresponds to a record associated with the second database write operation which was not performed, such as described at block 404. As a part of the first synchronization, each record that is examined in the first database, whether that resulted in an update of the corresponding record in the second database or not, can be marked as having a synchronization status that is verified or clean.

In some implementations, the process 400 can also include that, for each record in the second database which has a respective second synchronization field indicating that synchronization of the respective record is unverified, verifying that values of the respective record match values of a corresponding record in the first database. For example, each record in the second database may be double-checked to further verify synchronization between corresponding records in the first and second database. Such verification can include updating the values of the corresponding record of the second database to match the corresponding values in the corresponding record of the first database as needed, for example, when the values do not match. Then, the respective second synchronization field can be updated to indicate that synchronization of the respective record is verified. This process may correspond, for example, to the reverse synchronization process described above with respect to blocks 318-326. For example, for each record in the second database that includes an indication that synchronization of the respective record is unverified, a second synchronization of the respective record may be performed from the first database to the second database. The reverse synchronization can look at each record which is indicated as having a synchronization status as being unverified in the second database and update (if needed) each record from a corresponding record of the first database. Notably, the first database effectively serves as the primary database and source of truth. In some implementations, the tracking field for the indicator in the second database that the synchronization status is unverified may each be updated upon synchronization (whether the corresponding record of the second database was updated or not) to indicate that synchronization of the records is verified or clean.

Process 400 may also include that, after submitting the second request, whether the second write operation was performed is verified, and the first synchronization field of the first record is updated and the second synchronization field of the second record is updated, each to indicate the synchronization is verified. Process 400 may also include that, after copying the respective record from the first database to the second database or after verifying that values in the record match corresponding values in the respective record, a request can be submitted to the first database to update the first synchronization field of the respective record to indicate that synchronization is verified. For example, following copying or updating a record from the first database to the second database, a request can be provided to the first database to update its records to indicate that synchronization of that record is verified. This update can fail, for example, due to optimistic locking. As noted above, the request to update the first synchronization field may be unable to cause the corresponding record to be locked, in which case, the update of the first synchronization field may fail. Process 400 may also include, therefore, verifying again that values in the record match corresponding values in the respective record, and submitting a second request to the first database to update the first synchronization field of the respective record to indicate that synchronization is verified.

Process 400 may also include comparing each verified record of the first database with each corresponding verified record of the second database; and determining whether a discrepancy exists between a respective verified record of the first database and a respective verified record of the second database. When the discrepancy exists, a warning of the discrepancy can be logged or provided to a user of the system by a notification, for example, to a messaging service at the electronic device 102. This aspect may correspond, for example, to the block 328, discussed above.

Process 400 may also include comparing copying a first snapshot of the first database to a first table; copying a second snapshot of the second database to a second table; and determining whether corresponding records from the first table and the second table do not match. When the discrepancy exists, a warning of the discrepancy can be logged or provided to a user of the system by a notification, for example, to a messaging service at the electronic device 102. This aspect may correspond, for example, to the block 330, discussed above.

Process 400 may further include a switchover operation. For example, process 400 may include pausing write operations on the first database; performing a synchronization to copy or update records from the first database to the second database which indicate via the first synchronization field for each record of the first database that synchronization is unverified; switching a role of the first database from a primary database role to a secondary database role; switching a role of the second database from a secondary database role to a primary database role; and resuming write operations on the second database. This aspect may correspond, for example, to the block 332, discussed above. For example, switching the roles of the first database and the second database may include switching a source of truth for the databases by updating a pointer or other reference that points to or refers to the source of truth. Additional pointers can be updated to indicate that the second database is the primary database and as such, the write commands to the second database are performed on a guaranteed basis, while pointers updated to indicate that the first database is the secondary database can cause that write commands to the first database be performed on a best-effort basis. In some implementations, prior to resuming write operations on the second database, a synchronization can be performed to copy or update records from the first database to the second database which indicate via the second synchronization field for each record of the second database that synchronization is unverified.

Process 400 can also include, in some implementations, that the server can perform an action based on one or more anomalies and/or discrepancies described herein which may indicate an error state. For example, stakeholders may be notified, and the anomalies logged. In some implementations, the notification can cause a switchover operation or synchronization operation to abort. Such notifications can include output to be provided to the user, such as messages or reports. In some implementations, the notification can trigger on a user device, such as the electronic device 102, a physical activation of an actuator to cause a haptic sensation to the user, such as a vibration.

Figure 5:
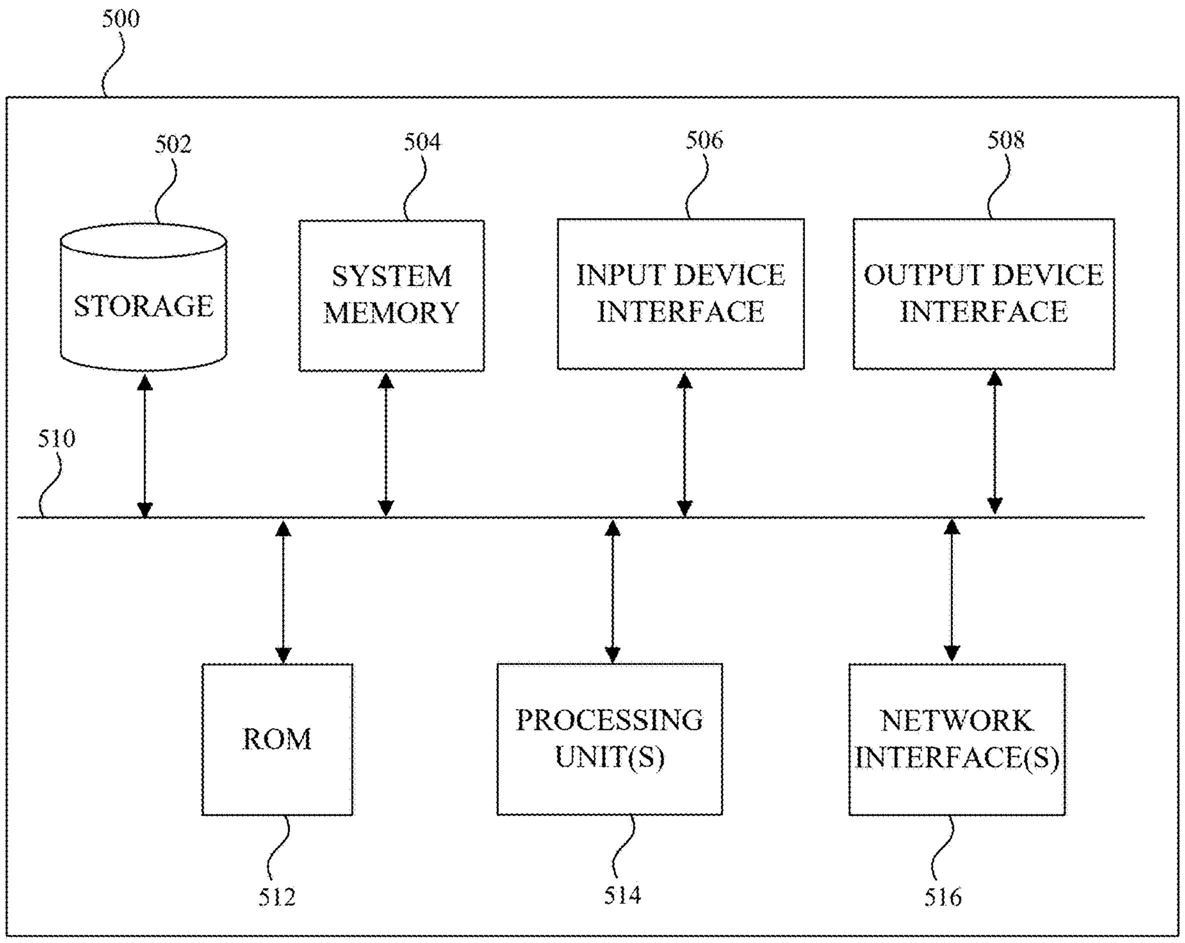
FIG. 5 depicts an example electronic system with which aspects of the present disclosure may be implemented, in accordance with one or more embodiments.

FIG. 5 depicts an example electronic system 500 with which aspects of the present disclosure may be implemented, in accordance with one or more embodiments. The electronic system 500 can be, and/or can be a part of, any electronic device for generating the features and processes described in reference to FIGS. 1-4, including but not limited to a laptop computer, tablet computer, smartphone, and wearable device (e.g., smartwatch, fitness band). The electronic system 500 may include various types of computer-readable media and interfaces for various other types of computer-readable media. The electronic system 500 includes one or more processing unit(s) 514, a persistent storage device 502, a system memory 504 (and/or buffer), an input device interface 506, an output device interface 508, a bus 510, a ROM 512, one or more processing unit(s) 514, one or more network interface(s) 516, and/or subsets and variations thereof.

The bus 510 collectively represents all system, peripheral, and chipset buses that communicatively connect the numerous internal devices of the electronic system 500. In one or more embodiments, the bus 510 communicatively connects the one or more processing unit(s) 514 with the ROM 512, the system memory 504, and the persistent storage device 502. From these various memory units, the one or more processing unit(s) 514 retrieves instructions to execute and data to process in order to execute the processes of the subject disclosure. The one or more processing unit(s) 514 can be a single processor or a multi-core processor in different embodiments.

The ROM 512 stores static data and instructions that are needed by the one or more processing unit(s) 514 and other modules of the electronic system 500. The persistent storage device 502, on the other hand, may be a read-and-write memory device. The persistent storage device 502 may be a non-volatile memory unit that stores instructions and data even when the electronic system 500 is off. In one or more embodiments, a mass-storage device (such as a magnetic or optical disk and its corresponding disk drive) may be used as the persistent storage device 502.

In one or more embodiments, a removable storage device (such as a floppy disk, flash drive, and its corresponding disk drive) may be used as the persistent storage device 502. Like the persistent storage device 502, the system memory 504 may be a read-and-write memory device. However, unlike the persistent storage device 502, the system memory 504 may be a volatile read-and-write memory, such as RAM. The system memory 504 may store any of the instructions and data that one or more processing unit(s) 514 may need at runtime. In one or more embodiments, the processes of the subject disclosure are stored in the system memory 504, the persistent storage device 502, and/or the ROM 512. From these various memory units, the one or more processing unit(s) 514 retrieves instructions to execute and data to process in order to execute the processes of one or more embodiments.

The bus 510 also connects to the input device interfaces 506 and output device interfaces 508. The input device interface 506 enables a user to communicate information and select commands to the electronic system 500. Input devices that may be used with the input device interface 506 may include, for example, alphanumeric keyboards, touch screens, and pointing devices. The output device interface 508 may enable the electronic system 500 to communicate information to users. For example, the output device interface 508 may provide the display of images generated by electronic system 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more embodiments may include devices that function as both input and output devices, such as a touchscreen. In these embodiments, feedback provided to the user can be any form of sensory feedback, such as visual feedback, auditory feedback, or tactile feedback; and input from the user can be received in any form, including acoustic, speech, or tactile input.

The bus 510 also couples the electronic system 500 to one or more networks and/or to one or more network nodes through the one or more network interface(s) 516. In this manner, the electronic system 500 can be a part of a network of computers (such as a local area network, a wide area network, an intranet, or a network of networks, such as the internet). Any or all components of the electronic system 500 can be used in conjunction with the subject disclosure.

Embodiments within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more embodiments, the tangible computer-readable storage medium can be directly coupled to a computing device, while in other embodiments, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be re-arranged, or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together into a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, an embodiment, the embodiment, another embodiment, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

submitting, to a first database, a first request to perform a first write operation to modify a first record of the first database, the first write operation comprising a first update to a first value of the first record and a second update to a first synchronization field of the first record to indicate that synchronization of the first record with a second record in a second database is unverified, the second record corresponding to the first record;

submitting, to the second database, a second request to perform a second write operation for the second record of the second database according to a best-effort policy that allows the second request to be dropped, the second write operation comprising the first update to a second value of the second record and the second update to a second synchronization field of the second record; and subsequent to the second request and when the second database does not yet include the second record due to the second request being dropped, copying the first record to the second database as the second record and submitting a request to update the first synchronization field of the first record to indicate that synchronization of the first record is verified.

2. The method of claim 1, wherein the request to update the first synchronization field fails, further comprising:

verifying that values in the second record match corresponding values in the first record and submitting another request to update the first synchronization field of the first record to indicate that synchronization is verified; and repeating the verifying and submitting until the update succeeds.

3. The method of claim 1, further comprising:

subsequent to the second request and when the second database includes the second record, verifying that values in the second record match corresponding values in the first record and submitting a request to update the first synchronization field of the first record to indicate that synchronization of the first record is verified.

4. The method of claim 3, wherein the request to update the first synchronization field fails, further comprising:

verifying that values in the second record match corresponding values in the first record and submitting another request to update the first synchronization field of the first record to indicate that synchronization is verified; and repeating the verifying and submitting until the update succeeds.

5. The method of claim 1, further comprising:

when the second synchronization field indicates that synchronization of the second record is unverified, verifying that values in the second record match corresponding values in the first record and updating the second synchronization field of the second record to indicate that synchronization of the second record is verified.

6. The method of claim 1, wherein the second write operation is not performed as part of the best-effort policy due to lack of system resources.

7. The method of claim 1, wherein after submitting the second request, verifying at the second database, that the first record was copied to the second database as the second record, and updating the the second synchronization field of the second record to indicate the synchronization is verified.

8. The method of claim 1, wherein the first write operation to modify the first record includes insertion of the first record in the first database or updating of an existing record.

9. The method of claim 1, further comprising:

for each record in the first database which has a respective first synchronization field indicating that synchronization of a respective record is unverified:

copying the respective record to the second database when a corresponding record does not exist in the second database, or verifying that values of the corresponding record match values of the respective record when the corresponding record does exist in the second database, and submitting a request to update the respective first synchronization field to indicate that synchronization of the respective record is verified.

10. The method of claim 1, further comprising:

for each record in the second database which has a respective second synchronization field indicating that synchronization of a respective record is unverified:

verifying that values of the respective record match values of a corresponding record in the first database, and updating the respective second synchronization field to indicate that synchronization of the respective record is verified.

11. The method of claim 1, further comprising:

comparing each record of the first database in which the first synchronization field indicates verified synchronization with each corresponding record of the second database in which the second synchronization field indicates verified synchronization; and determining whether a discrepancy occurs between the compared records of the first database and the compared corresponding records of the second database.

12. The method of claim 1, further comprising:

copying a first snapshot of the first database to a first table;

copying a second snapshot of the second database to a second table; and determining whether corresponding records from the first table and the second table contain mismatched values.

13. The method of claim 1, further comprising:

pausing write operations on the first database;

performing a synchronization to copy or update records from the first database to the second database which indicate via the first synchronization field for each record of the first database that synchronization is unverified;

performing a switchover comprising:

switching a role of the first database from a primary database role to a secondary database role; and switching a role of the second database from a secondary database role to a primary database role; and resuming write operations on the second database in the primary database role.

14. The method of claim 13, further comprising:

prior to resuming write operations on the second database, performing a synchronization to copy or update records from the first database to the second database which indicate via the second synchronization field for each record of the second database that the corresponding synchronization status is unverified.

15. The method of claim 13, wherein the switchover from the first database to the second database is completed within a retry time period for a database write operation such that a failed write operation succeeds upon retry after the switchover is completed.

16. The method of claim 1, further comprising:

performing a forward synchronization process comprising, for each record in the first database which has a respective first synchronization field indicating that synchronization of a respective record is unverified, copying the respective record to the second database when a corresponding record does not exist in the second database, or verifying that values of the corresponding record match values of the respective record when the corresponding record does exist in the second database, and submitting a request to update the respective first synchronization field to indicate that synchronization of the respective record is verified; and performing a reverse synchronization process comprising, for each record in the second database which has a respective second synchronization field indicating that synchronization of a respective record is unverified, verifying that values of the respective record match values of a corresponding record in the first database, and updating the respective second synchronization field to indicate that synchronization of the respective record is verified.

17. A device comprising:

a memory;

one or more processors, wherein the one or more processors are configured to:

submit, to a first database, a first request to perform a first write operation to modify a first record of the first database, the first write operation comprising a first update to a first value of the first record and a second update to a first synchronization field of the first record to indicate that synchronization of the first record with a second record in a second database is unverified, the second record corresponding to the first record;

submit, to the second database, a second request to perform a second write operation for the second record of the second database according to a best-effort policy that allows the second request to be dropped, the second write operation comprising the first update to a second value of the second record and the second update to a second synchronization field of the second record; and subsequent to the second request and when the second database does not yet include the second record due to the second request being dropped, copy the first record to the second database as the second record and submit a request to update the first synchronization field of the first record to indicate that synchronization of the first record is verified.

18. The device of claim 17, wherein the request to update the first synchronization field fails, wherein the one or more processors are further configured to:

verify that values in the second record match corresponding values in the first record and submit another request to update the first synchronization field of the first record to indicate that synchronization is verified; and repeat the verifying and submitting until the update succeeds.

19. The device of claim 17, wherein the one or more processors are further configured to:

when the second synchronization field indicates that synchronization of the second record is unverified, verify that values in the second record match corresponding values in the first record and update the second synchronization field of the second record to indicate that synchronization of the second record is verified.

20. A non-transitory computer-readable medium containing instructions thereon, which when executed by one or more processors, cause the one or more processors to:

submit, to a first database, a first request to perform a first write operation to modify a first record of the first database, the first write operation comprising a first update to a first value of the first record and a second update to a first synchronization field of the first record to indicate that synchronization of the first record with a second record in a second database is unverified, the second record corresponding to the first record;

submit, to the second database, a second request to perform a second write operation for the second record of the second database according to a best-effort policy that allows the second request to be dropped, the second write operation comprising the first update to a second value of the second record and the second update to a second synchronization field of the second record; and subsequent to the second request and when the second database does not yet include the second record due to the second request being dropped, copy the first record to the second database as the second record and submit a request to update the first synchronization field of the first record to indicate that synchronization of the first record is verified.

* * * * *